United States Patent

[11] 3,630,093

[72] Inventors Robert J. Morse;
Gilbert A. Pataky; Gilbert B. Pumphrey, all of Elyria, Ohio
[21] Appl. No. 3,470
[22] Filed Jan. 16, 1970
[45] Patented Dec. 28, 1971
[73] Assignee Bendix-Westinghouse Automotive Air Brake Company
Elyria, Ohio

[54] SPRING BRAKE RELEASE MEANS
6 Claims, 3 Drawing Figs.
[52] U.S. Cl. .................................................. 74/89.15, 188/170, 92/63
[51] Int. Cl. ..................................................... F16h 27/02
[50] Field of Search .......................................... 74/89.15; 188/170; 92/63, 64

[56] References Cited
UNITED STATES PATENTS
3,218,939 11/1965 Cruse ............................ 92/64
3,101,219 8/1963 Herrera ......................... 188/170
3,372,623 3/1968 Wearden et al. ............... 92/63

Primary Examiner—William F. O'Dea
Assistant Examiner—Wesley S. Ratliff, Jr.
Attorney—Scrivener, Parker, Scrivener and Clarke ABSTRACT: Mechanical release means for a spring-applied actuator comprising a threaded rod carried by the actuator and extending rearwardly into a fixed cylindrical socket of greater diameter than the rod and having a shoulder at the forward end of the socket, a rotatable hexagonal sleeve extending into the socket and engaging a hexagonal nut threaded onto the rod, the outer end of the sleeve being engaged by a cup-shaped, hexagonal cover member having an annular flange rotatably secured to the actuator housing, the cover member being rotatable so as to rotate the sleeve and drive the nut against the shoulder to draw the rod and actuator against the opposing force of the spring, the cover member serving also to exclude dirt and moisture from the housing. The release means including jam-type lock means releasable by mere rotation of the cover in a brake-releasing direction.

INVENTORS
Robert J. Morse
Gilbert A. Pataky
Gilbert B. Pumphrey

BY Scrivener, Parker, Scrivener & Clarke
ATTORNEYS

SPRING BRAKE RELEASE MEANS

DESCRIPTION OF THE INVENTION

This invention relates to fluid pressure actuators and more particularly to brake-applying actuators of the type comprising a fluid-pressure-applied service brake actuator and a tandemly mounted spring applied, pressure released emergency brake actuator which operates to apply the brakes by spring force upon diminution of predetermined spring brake release pressure.

Brake actuators of the type to which the present invention applies are well known. When the spring brake is applied under no-air conditions, that is to say, where air pressure is not available to return the spring brake piston to its release position, a problem exists in providing mechanical means for drawing the spring brake piston against the force of the spring to mechanically release the brake. Generally, the problem has been solved by the provision of a threaded shaft which is coaxial with the spring brake push rod with the shaft extending rearwardly out of the spring brake housing for engagement by a nut which is rotated by a socket wrench against a shoulder surrounding the threaded shaft so that the push plate, spring brake piston and associated mechanisms are moved against the force of the spring in a release direction until the brakes are released. A problem with prior release systems is the fact that if the mechanical release rod is not protected, it can be rendered very nearly inoperative through the clogging action of dirt and water; where cover plates are used to prevent the entrance of dirt, it has heretofore been necessary to remove the cover plates which can be dangerously time consuming where there has been an emergency stoppage on a crowded highway; furthermore, specially designed socket wrenches must be at hand in order for the operator to effect brake release; and if means for locking the release means against accidental rotation are provided, it is necessary to detach the locking means which increases the delay.

The object of the present invention is to overcome all of the foregoing problems by providing a cover member which not only excludes dirt, but also may itself be engaged by any available wrench, such as a common monkey wrench and be rotated to unlock novel locking means and then release the brakes without the necessity of removing the cover member or having available a special socket wrench as in the prior art.

Referring now to the drawings.

Figure 1:
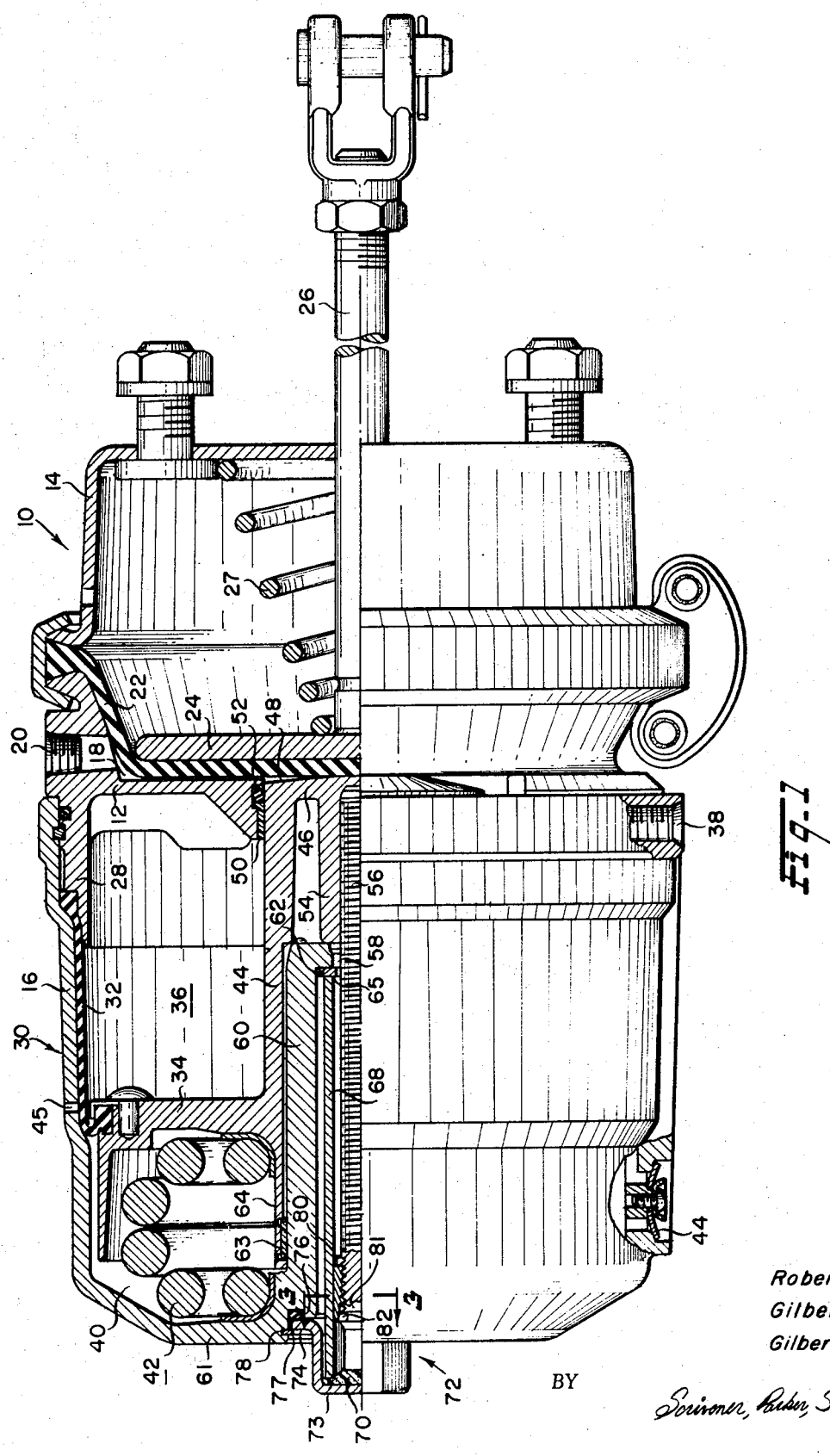
FIG. 1 is a horizontal view partly in elevation and partly in cross section of a combined service brake and spring brake actuator incorporating features of the invention.
Figure 2:
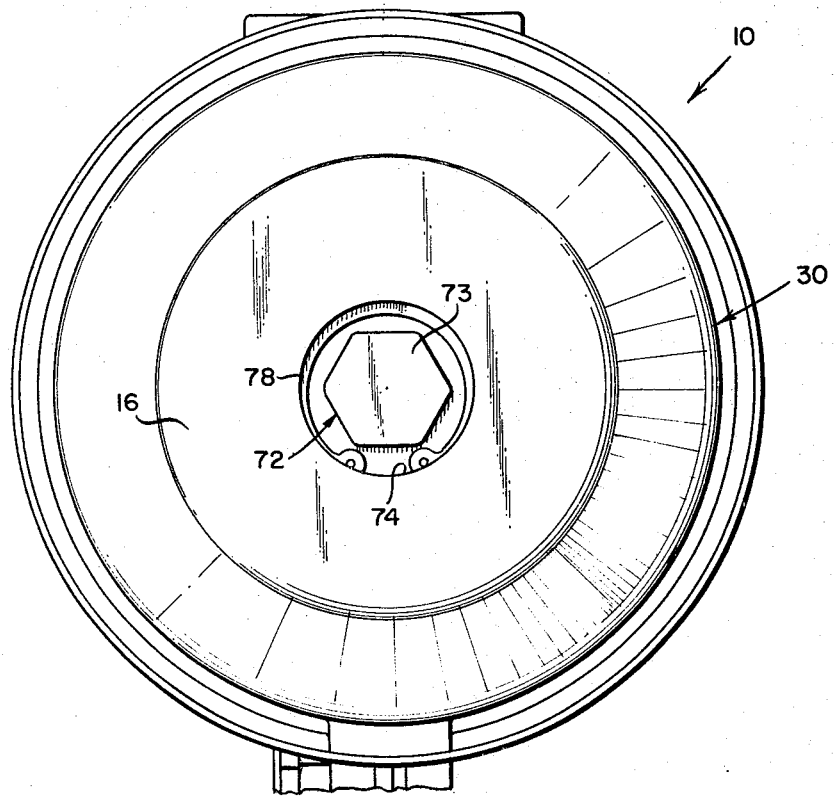
FIG. 2 is an end elevational view of a brake incorporating the present invention.
Figure 3:
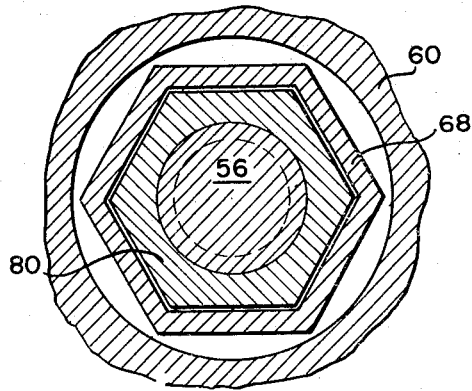
FIG. 3 is an enlarged vertical cross-sectional view taken substantially on the line 3—3 of FIG. 1.

Referring now to the drawings, the numeral 10 designates broadly the housing of a combined service brake and spring brake actuator. The housing is divided by a central wall 12 into a service actuator part 14 and a spring actuator part 16. The service part 14 includes a service pressure chamber 18 which is adapted to be connected to the usual brake pedal by way of a port 20. When service pressure is delivered to the pressure chamber 18 it operates on a diaphragm 22 to exert a brake applying force on a push plate 24 and push rod 26 against the force of a return spring 27 to apply the brake in a manner well recognized in the art.

Integral with the wall 12 is a stepped lip 28 which is telescopically received within the annular opening defined by the open end of a hollow spring brake container 30 which is divided by a diaphragm 32 and a piston portion 34 into a pressure chamber 36 adapted to be connected to a source of emergency fluid pressure by way of a port 38 and a spring chamber 40 containing a brake-applying spring 42 and which is connected to atmosphere through a check valve 44 which serves to release air in the spring chamber when the piston is moved to release position. An opening 45 is also provided through the cylinder wall to prevent a vacuum in the spring chamber from impeding movement of the piston 34 to brake applied position. The opening 45 is positioned so that in the release position of the drawing, the diaphragm 32 blocks the opening 45 to prevent the ingress of dirt and water into the spring chamber.

Integral with the piston 34 is a forwardly extending sleeve 44 closed at its forward end by a wall portion 46 defining a brake-applying abutment with the sleeve 44 being slidably and sealably received in a central opening 48 in the wall 12 separating the service and release cavities 18 and 36 and annularly grooved to receive a plastic bearing member 50 and an O-ring 52 which serves to isolate the cavities 18, 36 from each other.

Extending rearwardly from the the forward wall 46 of the sleeve 44 is an interiorally threaded boss 54 which has screwed therein the forward end of a threaded rod 56 extending rearwardly through an opening 58 in a stationary sleeve member 60 integral with the rear wall 61 of the spring brake container 30. The inner diameter of the sleeve 44 carried by the release piston 34 is sufficiently greater than the outer diameter of the fixed sleeve 60 that the latter is received within the former as shown and affords a sliding guide surface for a plastic bearing 63 received in a rearward extension 64 of the actuator sleeve 44. The interior of the fixed sleeve 60 is cylindrical in cross section and has at its inner end a shoulder 62 whose opposite side is engageable by the rear end of the boss 54 to serve as a stop for the release piston 34 when it has been subjected to sufficient pressure in the cavity 36 to move it to the release position of the drawing.

Engaging the shoulder 62 is an annular washer 65 having an exposed face engaged by the forward end of a hex-shaped sleeve 68 whose opposite end is engaged by a compressed resilient foam cushion 70 received in a cup-shaped cover member 72 having a rearwardly projecting part 73 of hex configuration and whose inner side drivingly engages the end of the hex-shaped sleeve 68. The cover member 72 is provided with an integral annular flange 74 whose inner side engages an O-ring 76 received in an annular groove in a shoulder defined by a counter bore 77 on the outer face of the rear wall 61. The outer side of the flange 74 is engaged by a snap ring 78 which urges the inner face of the flange into slidable sealing engagement with the O-ring 76.

The inner surface of the hex sleeve 68 engages a nut 80 threadedly received on the rod 56. The nut normally occupies a position at the extreme end of the rod 56 and is provided with a lip 81 which overhangs a ring clip 82 received in a groove at the extreme end of the shaft 56 which prevents the nut from being screwed entirely off the shaft in the event the hex-shaped sleeve is accidentally rotated in the wrong direction and at the same time the lip 81 engages the ring 82 with a jam fit which effectively locks the parts of the release mechanism against relative movement when the parts are in the inoperative position shown in FIG. 1.

In operation, when release pressure at a predetermined level is admitted to the port 38 and release cavity 36, the piston 34 is moved to the position of FIG. 1. In this position, the boss 54 engages the forward side of the shoulder 62 of the fixed sleeve 60 and thereafter the service brake may be operated in the usual manner in response to fluid pressure admitted to the service cavity 18 through the service port 20. In the event of an emergency loss of air in the spring brake release cavity 36 or when the pressure is deliberately exhausted therefrom when the operator wishes to park the vehicle, the spring 42 expands to move the piston 34 to the right which causes the end wall 46 of the piston sleeve 44 to engage the service diaphragm 22 through the opening 48 in the wall 12 between the service and release cavities 18 and 36 to move the service diaphragm 22, push plate 24 and rod 26 to the right to apply the brakes.

Often when spring brakes are applied in response to an emergency loss of pressure, a vehicle is brought to a sudden stop on a crowded highway. It is highly desirable that in the absence of release pressure the spring brakes be mechanically releasable as quickly as possible. In accordance with the present invention, when the spring brakes are in their applied position so that the piston 34 and end wall 46 of the piston sleeve 44 are moved to the right in FIG. 1, the rod 56, being screwed into the boss 54 of the piston 34, also moves to the right and the nut 80 slides from the position shown within the hex shaped sleeve 68 to a position just clear of the confronting face of the abutment washer 65. In order to mechanically release the brakes, the operator merely applies any conventional wrench of proper size to the cap 72 and turns this clockwise to rotate the sleeve 68 and nut 80. Because the threaded rod 56 is nonrotatable, as the nut is screwed toward the washer 65 it engages the washer and disengages the nut locking lip 81 from the ring clip 82 whereupon continued rotation the cap member 72 causes the nut 80 to operate on the rod 56 while reacting against the washer 65 to move the rod to the left which in turn moves the wall part 46 of the actuator sleeve 44 and the piston 34 to the left to compress the spring 42 until the brakes are released through the action of the return spring 27.

When emergency pressure has been restored on the vehicle and admitted to the release cavity 36, the operator merely rotates the hex shaped cap 72 in a counterclockwise direction until he feels the lip 81 of the nut engage and jam against the ring clip 82 whereupon the nut 80, the sleeve 68 and cap 72 are essentially locked in place with the locking arrangement being readily releasable by mere application of sufficient torque on the cap member 72 in a clockwise direction and without the necessity of going through the procedure of unscrewing or unbolting special locking clips or cover members. The described locking means is an important feature of the invention as is also the permanently accessible exterior tool receiving means afforded by the cover member 72 which serves not only as a means for excluding dirt and moisture but also the means for applying torque to the release nut 80 through the sleeve 68.

What is claimed is:

1. In an actuator of the type including a housing having front and rear walls having aligned central openings therethrough, a movable wall in said housing dividing the interior thereof into a pressure chamber and a spring chamber, a spring in said spring chamber at all times urging said movable wall toward said front wall, but being compressible in the opposite direction by said movable wall in response to a predetermined pressure in said pressure chamber acting on said movable wall, means for mechanically retracting said movable wall and for compressing said spring in the absence of said predetermined pressure comprising a threaded shaft rigidly secured at one end to said movable wall and extending axially outwardly toward said rear wall to provide an opposite end adjacent said rear wall, a nut threadedly received on said shaft and normally positioned at said opposite end thereof, a cover member rotatably carried by said rear wall and sealingly closing the opening therethrough, said cover member being fixed against axial movement and having a tool-receiving part exposed to the outer side of said rear wall, a driving member operatively connected to said cover member and drivingly engaging said nut, and axially fixed abutment means between said nut and said movable wall constructed and arranged to be engaged by said nut upon the application of torque to said cover member to retract said shaft and said movable wall against the opposing force of said spring.

2. The actuator of claim 1 including a hollow sleeve carried by said rear wall in coaxial relationship with respect to the opening therethrough and extending forwardly toward said front wall, said sleeve defining a socket open at its forward end, said abutment being defined by a shoulder at the forward end of said socket, said threaded shaft extending through the open forward end of said socket with the nut being housed within said socket, and said driving member extending axially from the inner side of said cover member into said socket and drivingly engaging said nut.

3. The actuator of claim 2 wherein said driving member is a sleevelike element having flat internal sidewalls drivingly engaging complementary sides of said nut, said cover member being internally recessed to receive the rear end of said sleevelike driving member, and a driving connection between said recess and said rear end of the driving member, said driving member extending from said recess forwardly into close adjacency with said shoulder.

4. The actuator of claim 1 including a counter bore on the outer side of said rear wall coaxial with the opening therethrough and defining a recessed shoulder, an annular groove in said shoulder surrounding said opening, an O-ring in said groove, an integral flange on said cover member having an inner face sealingly and slidably engaging said O-ring and a spring clip engaged in a groove in said counter bore and engaging the outer face of said flange to retain the latter in sealing engagement with said O-ring.

5. The actuator of claim 1 including cooperating jamming elements carried by said nut and said shaft, said elements being constructed and arranged to cooperate with each other to jammingly lock said nut to said shaft when said nut is rotated to an inoperative position on said shaft, but being releasable when said nut is rotated in the opposite direction by a predetermined degree of torque on said cover member.

6. In a spring-applied, pressure-released actuator having front and rear walls and including a movable wall therebetween operable in response to opposing forces of fluid pressure and spring means, mechanical means for retracting said movable wall against the force of said spring means comprising a threaded rod carried by said movable wall and extending toward said rear wall, a nut on said threaded rod, abutment means between said movable wall and said nut and against which said nut may be rotated in one direction to retract said movable wall against the force of said spring means, means accessible from the outer side of said rear wall for rotating said nut, an annular lip on the side of said nut remote from said abutment, said lip being annularly spaced at its outer end from said threaded shaft but tapering inwardly toward said shaft, an annular projection on said threaded shaft positioned so as to be received beneath said lip when said nut is rotated a predetermined distance in a direction opposite to that which retracts said movable wall with continued rotation of said nut causing the tapered wall of said lip to jam against said annular projection and releasably lock said nut against accidental rotation on said shaft.

* * * * *